Oct. 26, 1948.   C. M. HINES ET AL   2,452,191
SPEED DIFFERENTIAL DETECTING APPARATUS
Original Filed Feb. 9, 1944
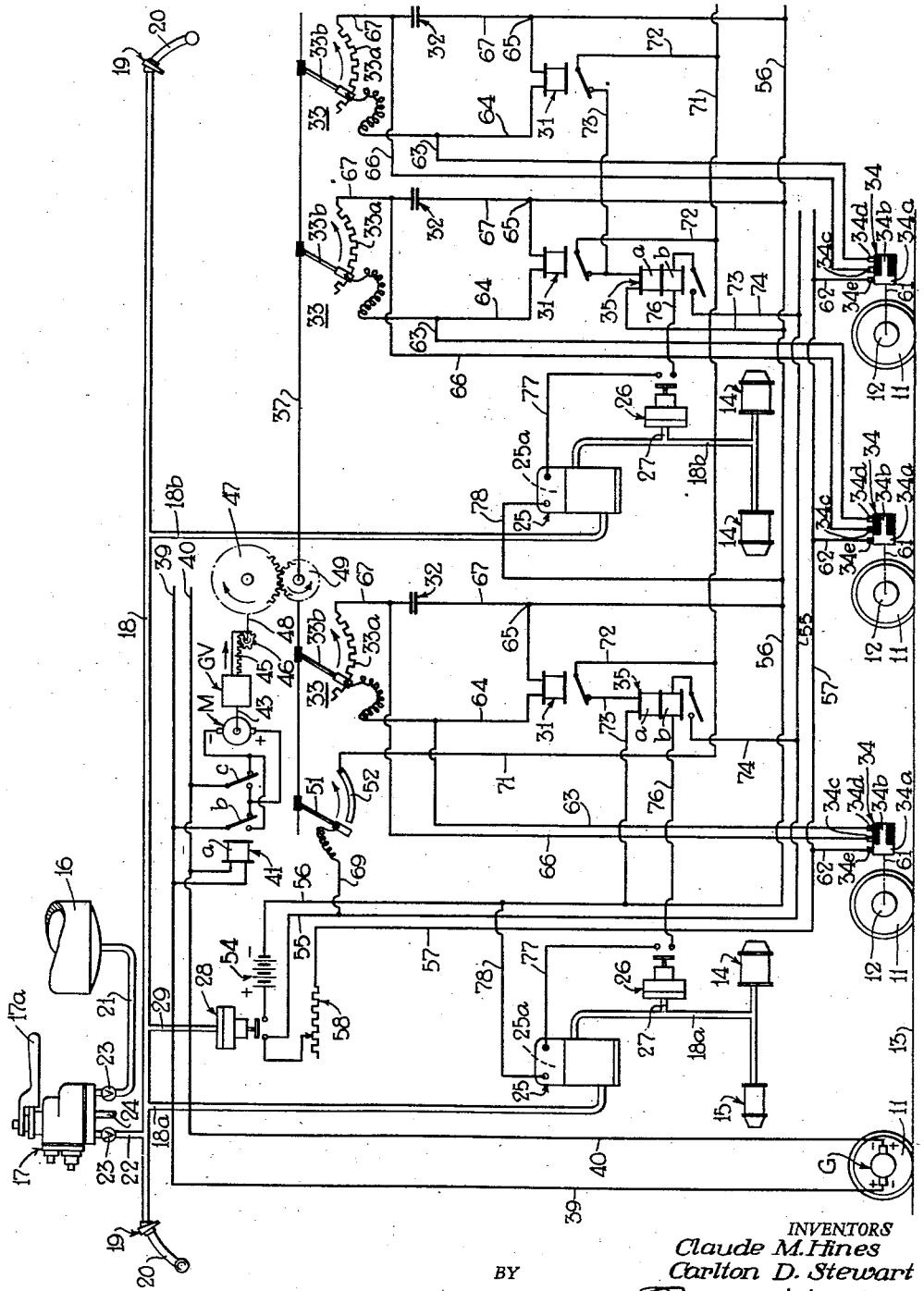
INVENTORS
Claude M. Hines
Carlton D. Stewart
BY
ATTORNEY Patented Oct. 26, 1948

2,452,191

UNITED STATES PATENT OFFICE 2,452,191

SPEED DIFFERENTIAL DETECTING APPARATUS

Claude M. Hines, Verona, and Carlton D. Stewart, Wilkinsburg, Pa., assignors to The Westinghouse Air Brake Company, Wilmerding, Pa., a corporation of Pennsylvania Original application February 9, 1944, Serial No. 521,640. Divided and this application January 26, 1945, Serial No. 574,774

6 Claims. (Cl. 175—355)

This invention relates to speed differential detecting apparatus and has particular relation to apparatus for detecting a predetermined difference in the rotational speed of two separately rotated members for a desired indicating or control purpose, the present application being a division of our prior copending application, Serial No. 521,640, filed February 9, 1944, issued March 12, 1946 as Patent No. 2,396,424, and assigned to the assignee of this application.

While our invention is applicable to any situation in which it is desired to detect a predetermined variation of the rotational speed of one rotary element with respect to that of another rotary element for a desired indicating or control purpose, we have devised it for use particularly in connection with a vehicle wheel, such as a railway car wheel, for the purpose of detecting the slipping condition of the vehicle wheel and for controlling the brakes associated with the wheel so as to prevent sliding thereof.

As employed herein, the term "slipping condition" and its variants as applied herein to a vehicle wheel refers to the rotation of the wheel at a speed different from that corresponding to the vehicle speed at a given instant. The wheel speed occurring during a slipping condition may be either less than or greater than a speed corresponding to vehicle speed depending upon whether the slipping condition is induced by excessive braking or by excessive propulsion torque, respectively. The term "sliding condition" or its variants refers solely to the locked condition of a vehicle wheel due to excessive braking. The terms "slipping condition" and "sliding condition" of a vehicle wheel are thus not synonymous and the distinction therebetween should be borne in mind.

Various types of apparatus have been proposed and employed to detect the slipping condition of a vehicle wheel due to braking which may be classified generally as either of two types (1) the rate-of-change-of-speed type and (2) the speed-differential type. Our present invention comprises deceleration control apparatus embodying novel wheel slip detecting apparatus of the speed-differential type.

The principle of operation of our improved speed-differential type of wheel-slip detecting apparatus is to vary the drop-out time of an electrical relay substantially in proportion to vehicle speed and to periodically energize the relay momentarily at a frequency corresponding substantially to the rotational speed of an individual wheel. If the interval of time between successive energizing impulses for the relay exceeds the drop-out time of the relay as determined by the speed of the vehicle, the relay will drop out to indicate a given reduction in the rotational speed of an individual vehicle wheel below that corresponding to vehicle speed at a given instant. By reason of the fact that rotation of an individual vehicle wheel at more than a certain amount below that corresponding to vehicle speed at any given instant is synonymous with a wheel slip condition, the drop-out of the relay is effected automatically in response to a wheel-slip condition.

In combination with our improved wheel-slip detecting apparatus we have provided an arrangement responsive to the drop-out of the relay for initiating a reduction in the degree of application of the brakes associated with the slipping wheel and including means for subsequently increasing the degree of application of the brakes when the slipping wheel is restored to a speed corresponding to vehicle speed.

It is an object of our present invention, therefore, to provide a novel and improved apparatus for detecting a predetermined differential in the rotational speeds of two rotary elements, such as vhicle wheels.

The above object and other objects of our invention which will be made apparent hereinafter, are attained by a single illustrative embodiment of our invention subsequently to be described in detail and shown in the accompanying single sheet of the drawings.

Referring to the single figure of the drawings, there is shown diagrammatically a brake control apparatus embodying our improved wheel-slip detecting apparatus. For simplicity, equipment is shown for only one vehicle or car, although our invention may be readily employed in a brake control equipment for an entire train of cars as will be more fully made apparent hereinafter.

The vehicle on which the equipment shown in the drawings is carried may be a locomotive or other self-propulsion traction vehicle or it may be any one in a train of cars. For purposes of the present application it will be assumed to be that for a locomotive or other traction vehicle.

As illustratively shown, the vehicle is provided with four wheel-and-axle units, hereafter referred to simply as wheel units, suitably mounted therein in conventional manner, although the number of wheel units on the vehicle is immaterial.

Each of the four wheel units shown in the drawing comprises a pair of wheels 11, only one of each pair being visible in the drawing, which wheels are fixed at opposite ends of a connecting axle 12 and roll on corresponding track rails respectively, indicated by the line 13.

While we contemplate and intend the application of our invention to conventional or standard high speed train brake equipment, such as the familiar Westinghouse HSC type, we have for simplicity illustrated a simple "straight air" type of brake control equipment merely for the purpose of demonstrating the basic principles of embodying our novel wheel-slip detecting apparatus in the brake control mechanism.

The brake control equipment shown comprises a plurality of brake cylinders for effecting operation of any suitable brake mechanism to exert a braking effect on the wheels 11. As shown, three relatively large brake cylinders 14 are provided for effecting operation of the brakes on three of the wheel units respectively and a smaller brake cylinder 15 is provided for effecting application of the brakes on one of the wheel units. The various brake cylinders and the wheel units with which they are associated are illustrated in substantially vertical alignment.

The reason for providing a relatively small brake cylinder 15 in connection with the one wheel unit is to insure that the wheels of this unit will rotate at all times in accordance with the speed of the vehicle. It will be understood, however, that the smaller brake cylinder 15 is illustrative merely of apparatus for providing an underbraked wheel unit and that a brake cylinder identical in size to the brake cylinders 14 may be provided in connection with the underbraked wheel unit if suitable brake levers and brake rigging are provided for effecting a reduced degree of braking effect on the corresponding wheel unit for an equivalent fluid pressure in all the cylinders.

The fluid pressure brake control equipment further comprises a reservoir 16 which is normally charged to a certain fluid pressure, such as one-hundred pounds per square inch, by a fluid compressor not shown; a self-lapping brake valve 17 of well known type; and a so-called straight-air pipe or control pipe 18 that extends from end to end of the vehicle and is provided at opposite ends thereof with suitable angle cocks 19 and hose couplings 20 in conventional manner for coupling the sections of the pipe on two adjacent vehicles. As shown, the angle cocks 19 are in closed position since it is assumed that the vehicle is operating as an individual unit.

The brake valve 17 is connected by a pipe 21 to the reservoir 16 and by a pipe 22 to the control pipe 18, suitable hand-operated valves 23 being interposed in the pipes 21 and 22 for cutting the brake valve 17 out of operation. In the drawing the valves 23 are assumed to be in open position, thereby rendering the brake valve 17 operative to control the pressure in the control pipe 18 in the manner now to be described.

With the handle 17a of the brake valve 17 in its normal or brake release position, the valve mechanism of the brake valve cuts off the supply of fluid under pressure from the reservoir 16 and pipe 21 to the pipe 22 and establishes a connection between pipe 22 and an exhaust port and pipe 24 through which fluid under pressure is vented to atmosphere from the control pipe 18, thereby reducing the pressure in the control pipe 18 to atmospheric pressure.

When the brake valve handle 17a is shifted in a horizontal plane out of brake release position into a so-called application zone, the exhaust communication between the pipe 22 and the exhaust port and pipe 24 is closed and communication is established between the pipes 21 and 22 so that fluid under pressure is then supplied from the reservoir 16 to the control pipe 18. The valve mechanism of the brake valve is so constituted that it is automatically self-lapping in accordance with the degree to which the brake valve handle 17a is shifted out of brake release position into the application zone. Thus, as the degree of displacement of the brake valve handle 17a into the application zone increases, the pressure established in the control pipe is correspondingly increased.

Brake cylinders 14 and 15 are connected to and supplied with fluid under pressure from the control pipe 18 through a plurality of branch pipes 18a and 18b. Interposed in the branch pipes 18a and 18b are magnet or solenoid operated control valve devices 25, hereafter referred to simply as magnet valve devices. The magnet valve devices 25 are of any suitable construction and are so arranged as to provide communication normally through the branch pipes 18a and 18b from the control pipe 18 to corresponding brake cylinders when the magnet windings 25a thereof are deenergized. When the magnet winding 25a of either of the magnet valve devices 25 is energized, the supply communication through the corresponding branch pipe 18a or 18b to the brake cylinders is closed and an exhaust communication is established through which fluid under pressure is vented to atmosphere from the corresponding brake cylinders at a relatively rapid rate.

A fluid pressure responsive switch device 26 is connected by a short branch pipe 27 to each of the branch pipes 18a and 18b in a manner to be responsive at all times to fluid pressure in the brake cylinders. It will be understood that the fluid pressure operated switch devices 26 are illustrated only diagrammatically and that they are preferably of the type, described in detail and claimed in Patent 2,096,492 to Ellis E. Hewitt, in which the switch contacts are actuated by snap-action from an open position to a closed position in response to an increase of the pressure in the brake cylinders above a certain pressure, such as fifteen pounds per square inch, and actuated by snap-action from closed position to open position in response to the reduction of the pressure in the brake cylinders below fifteen pounds per square inch.

An additional fluid pressure responsive switch device 28, similar to the switch devices 26, is provided and is connected by a branch pipe 29 to the control pipe 18. The switch device 28 is responsive to a different critical pressure, however, than the switch devices 26. Thus, the switch contacts of switch device 28 are actuated from an open position to a closed position in response to an increase of the pressure in the control pipe 18 above five pounds per square inch and conversely are actuated from a closed position to an open position in response to the reduction of the pressure in the control pipe from above to below five pounds per square inch. It will be understood, therefore, that the pressure responsive switch 28 is closed at the time a brake application is initiated and is opened thereafter only when the brakes are substantially completely released.

According to our invention, the apparatus provided for detecting a wheel-slip condition comprises for each normally braked wheel unit, not including the underbraked wheel unit, an electrical relay 31, a condenser 32, a variable resistance or rheostat 33, and a commutator switch device 34. Associated with and controlled by one of the several relays 31 is a multiple coil relay 35, which in turn controls energization and deenergization of the magnet winding 25a of the corresponding magnet valve device 25 associated with the brake cylinder 15 and the one of the brake cylinders 14 connected thereto. The other two relays 31 have associated therewith and severally control a multiple coil relay 35, which in turn controls energization and deenergization of the magnet winding 25a of the corresponding magnet valve 25 associated with the two connected brake cylinders 14.

Each of the rheostats 33 comprises a resistor 33a and an associated rotarily shiftable contact arm 33b fixed radially in insulated relation to a rotary shaft 37.

The shaft 37 is rotated by apparatus, later to be described, so as to position the several contact arms 33b of the different rheostats 33 in unison and thereby vary the amount of the corresponding resistances 33a utilized in accordance with the speed of the vehicle.

The apparatus for positioning the rheostat contact arms 33b in accordance with the speed of the vehicle comprises a generator G of a suitable direct-current type arranged in a manner such that the rotary armature thereof is rotated in accordance with the rotational speed of the underbraked wheel unit. As diagrammatically indicated in the drawing, the rotary armature shaft of the generator G is suitably mounted in the journal casing at the end of the axle connecting the wheels of the underbraked wheel unit and the rotary armature shaft is suitably coupled to the end of the axle. The generator G is so designed as to provide a voltage at the brush terminals thereof that is substantially proportional to the rotational speed of the wheels of the underbraked wheel unit and, therefore, substantially proportional to the speed of the vehicle at all times.

Connected to the opposite brush terminals of the generator G are two wires 39 and 40, respectively. A reversing relay 41 of the polarized type is provided having an operating winding a connected across the wires 39 and 40 and arranged to be controlled according to the polarity of the voltage supplied by the generator G. It will be apparent that the polarity at the brush terminals of the generator G reverses in correspondence with the reversal in the direction of rotation of the wheels and consequently upon reversal in the direction of travel of the vehicle.

For the forward direction of travel of the vehicle, herein taken to correspond to a counterclockwise direction of rotation of the wheels of the underbraked wheel unit, it will be assumed that the left-hand brush terminal of the generator G is of positive polarity and the right-hand brush terminal is of negative polarity. A reversal of polarity will occur upon a reversal in the direction of rotation of the wheels of the underbraked wheel unit so that in such case the left-hand brush terminal of the generator will be of negative polarity and the right-hand brush terminal will be of positive polarity.

The reversing relay 41 is provided with a pair of reversing contacts b and c which are actuated to the position shown in the drawing in response to the normal polarity at the brush terminals of the generator G for the forward travel of the vehicle. Upon a reversal of polarity at the brush terminals of the generator G, the contacts b and c of the relay 41 are actuated to a position opposite to that in which they are shown.

The contacts b and c of the reversing relay 41 control the connection between a direct-current motor M and the wires 39 and 40 in such a manner as to maintain a constant polarity of voltage on a motor M, thereby maintaining a uniform direction of rotation of the motor M.

The motor M drives a fly-ball governor device GV through a rotary shaft 43 connecting the rotary armature shaft of the motor and the rotary operating shaft of the governor device.

A fly-ball governor device GV is of any suitable construction. In view of the fact that governor devices of this type are well known, it is deemed unnecessary to specifically illustrate the details of the governor device except to point out that outward movement of the fly-balls of the governor in response to increasing speed of rotation of the operating shaft thereof causes longitudinal movement of a gear rack member 45 in the right-hand direction from an innermost or zero speed position as indicated by the arrow, the amount of movement of the gear rack 45 out of the zero speed position corresponding substantially to the speed of rotation of the motor M which, in turn, corresponds to the voltage supplied by the generator G. It will thus be apparent that the gear rack 45 is positioned automatically in accordance with the speed of the vehicle.

Suitable movement-amplifying gear mechanism is provided whereby a relatively small longitudinal movement of the gear rack 45 is translated into a larger corresponding rotary movement of the shaft 37 and consequently of the rheostat contact arms 33b. As shown, such movement-amplifying gear mechanism may comprise a pinion 46 meshed with the gear rack 45 and effective upon movement of the rack to rotate a larger gear wheel 47 through a common shaft 48 to which the pinion and gear wheel are fixed. The gear wheel 47 meshes with a smaller gear wheel 49, of suitable gear ratio thereto, that is fixed on the rotary shaft 37.

It will thus be apparent that as the gear rack 45 is shifted in the right-hand direction from the innermost or zero-speed position thereof, the shaft 37 and the rheostat contact arms 33b are correspondingly shifted in the direction indicated by the arrows to cut out a progressively increasing amount of the resistors 33a.

For a reason which will be hereinafter explained, a switch device is provided comprising a contact arm 51 fixed radially in insulated relation to the shaft 37 and a stationary arcuate contact 52. The relation of the contact arm 51 and the arcuate contact 52 is such that the contact arm engages the arcuate contact only when the speed of the vehicle exceeds a certain low speed, such as ten miles per hour, and conversely disengages the arcuate contact only when the speed of the vehicle reduces below ten miles per hour.

For the purpose of effectuating the operation of the wheel-slip detecting apparatus, there is provided a suitable source of substantially uniform direct-current voltage, as for example a storage battery 54 arranged to be suitably charged in conventional manner not shown.

Associated with the battery 54 are three battery wires 55, 56, and 57. The battery wire 55 is connected to the positive terminal of the battery 54 when pressure switch 28 is closed and is hereinafter designated the positive battery wire.

The wire 56 is connected directly to the negative terminal of the battery 54 and is hereinafter designated the negative battery wire.

The battery wire 57, like positive battery wire 55, is connected to the positive terminal of the battery 54 only when the pressure operated switch 28 is closed.

A variable resistor 58 is interposed between the battery wire 57 and the pressure switch 28 and serves a purpose which will be explained later.

*Operation*

Let it be assumed that the vehicle is at a standstill, with the reservoir 16 charged to the normal pressure carried therein and with the brake valve handle 17a in its brake release position so that the brakes are released. Under these circumstances, the motor M which drives the governor GV is stopped for the reason that the generator G is stopped and correspondingly supplies no voltage to the motor. As a result, the gear rack 45 of the governor is in its innermost or zero-speed position as shown, thereby correspondingly positioning the rheostat contact arms 33b and the switch contact arm 51 as shown in the drawing. At the same time, the pressure switches 26 and 28 are open because the brake cylinders and the control pipe 18 are at atmospheric pressure.

Let it now be assumed that the operator causes propulsion power to be applied to one or more or all of the wheel units and that the vehicle is correspondingly accelerated in a forward direction. In such case the polarity of the voltage delivered by the generator G is such as to maintain the contacts b and c of the reversing relay 41 in the position shown in the drawing. It should be understood that the contacts of the reversing relay 41 are actuable in response to a voltage lower than that required to start the motor M. Consequently, the contacts of the relay 41 are always positioned in accordance with the direction of travel of the vehicle before rotation of the motor M begins.

As the speed of the vehicle increases, the voltage delivered by the generator G correspondingly increases and consequently the motor M operates the governor GV at a progressively increasing speed so as to cause the gear rack 45 to be shifted in the right-hand direction a progressively increasing amount out of its innermost or left-hand position.

When the speed of the vehicle exceeds a certain speed, such as ten miles per hour as hereinbefore stated, the switch contact arm 51 engages the contact 52 and thereafter continues to engage it as long as the speed is exceeded. Due to the fact that the pressure switch 28 is open, however, the engagement of the switch contact arm 51 with the contact 52 has no immediate effect.

For the purpose of further explaining the operation of the equipment let it be assumed that the vehicle is accelerated to a traveling speed, such as sixty miles per hour, and that at such time the operator desires to apply the brakes to bring the vehicle to a stop. In such case, the operator cuts off the propulsion power applied to the wheel units of the vehicle and operates the brake valve handle 17a out of its brake release position a desired amount into the application zone corresponding to the desired degree of application of the brakes.

Let it be assumed that the operator shifts the brake valve handle 17a to a position in the application zone thereof so as to establish fifty pounds per square inch fluid pressure in the control pipe 18. The brake cylinders are thus charged with fluid at a corresponding pressure by flow of fluid from the control pipe 18 to the brake cylinders through the branch pipes 18a and 18b. The brakes are thus applied on the wheel units and the vehicle correspondingly decelerates.

At the instant pressure switch 28 closes in response to an increase of pressure in control pipe 18 above five pounds per square inch, the commutator switch devices 34 associated with the several wheel units are operative to cause periodic energization of the winding of the corresponding relays 31 and charging of the corresponding condensers 32, in unison.

As diagrammatically shown, each of the commutator switch devices 34 comprises a disk or drum having thereon a peripheral insulating surface in which is embedded a metallic contact ring 34a having an integrally formed or attached contact segment 34b extending laterally therefrom. It will be understood that the contact segment 34b is flush with the contact surface of the insulating portion in which it is embedded so as to provide a smooth contact surface for a pair of contacts or brushes 34c and 34d stationarily mounted in a suitable manner and engaging the insulating surface and the contact segment 34b alternately as the disk or cylinder is rotated.

Engaging the contact ring 34a is a third brush or contact 34e. The three brushes 34c, 34d, and 34e may be carried in a single brush holder in suitably insulated relation. The two brushes 34c and 34d are in axial alignment so as to simultaneously engage and disengage the contact segment 34b, thereby being periodically connected to the brush 34e at the same time.

The drum or disk of the commutator switch device 34 may be attached directly to the end of the axle 12 of the corresponding wheel unit within the journal housing in coaxial relation to the axis of rotation of the axle or it may be rotatively mounted within the journal housing and coupled to the end of the axle 12 as by a flexible coupling or shaft indicated by the broken line 61.

It will be apparent that once during each revolution of the disk of a commutator switch device 34, at the time the brushes 34c and 34d simultaneously engage the contact segment 34b, a circuit is established for energizing the winding of the relay 31 and charging the condenser 32 associated therewith. This energizing circuit may be traced from the positive terminal of the battery 54 by way of closed pressure switch 28, resistor 58, battery wire 57, three branch circuits corresponding to the three separate wheel units provided with commutator switch devices, each of said branch circuits extending by way of a branch wire 62, brush 34e, and contact ring 34a to contact segment 34b, where the individual branch circuit divides into two parallel branches, one branch extending by way of brush 34d, a wire 63, a wire 64 including the winding of the relay 31 to a point 65 and the other branch extending by way of the brush 34c, a wire 66, a wire 67, condenser 32, and a wire 67 to the point 65, whence the individual branch circuit continues by way of the wire 67 to the negative battery wire 56 and thus to the negative terminal of the battery 54.

Upon energization of the winding of the relay 31, the single back contact thereof is actuated to its picked-up or open position.

The condenser 32 is charged to a degree depending upon the amount of the resistor 58 included in the circuit, which resistor controls the charging time of the condenser 32. It will be apparent that with a given amount of the resistor 58 included in the circuit there will be a corresponding charging time for the condenser 32 with a corresponding charge built-up on the condenser during the interval of time that the contact segment 34b engages the brush 34c. If the amount of the resistor 58 included in the circuit is increased, the charging time of the condenser 32 will be correspondingly increased. This results in a corresponding decrease in the charge built-up on the condenser 32 during the interval of time that the contact segment 34b engages the brush 34c. Similarly, if the amount of the resistor 58 included in the circuit is decreased, the charging time for the condenser 32 will be decreased and consequently a greater charge will be built-up on the condenser 32 during the interval of time the contact segment 34b engages the brush 34c.

As will be subsequently made apparent, the adjustment or setting of the resistor 58 thus controls the sensitivity of the apparatus, that is, the critical speed-differential between an individual wheel unit and vehicle speed to which the apparatus is sensitive.

When the contact segment 34b disengages the brushes 34c and 34d, the energizing circuit for the winding of the relay 31 and the charging circuit for the condenser 32 are simultaneously interrupted. By reason of a loop circuit comprising the winding of each relay 31, its associated condenser 32, and the corresponding resistor 33a, each condenser 32 immediately discharges, upon interruption of its charging circuit, through the winding of the corresponding relay 31 to maintain the winding of the relay 31 energized for an interval of time varying with the amount of the resistor 33a included in the discharge circuit.

The arrangement is such that as long as the wheels of each wheel unit continue to roll in the normal manner without slipping, the discharge time of each condenser 32 is such that condenser discharge current remains between successive chargings of the condenser to maintain the winding of the relay energized and the contact thereof in picked-up position. In other words, if the wheels of a wheel unit do not slip more than a certain degree, that is, reduce more than a certain amount below a speed corresponding to vehicle speed, reengagement of the contact segment 34b with the brush 34d and consequent energization of the winding of the relay 31 to maintain the contact thereof picked-up will occur before the current discharged from the condenser dies away sufficiently to permit the drop-out of the contact of the relay 31.

It should be understood that suitable allowance is made for a certain small amount of reduction in rotational speed of individual wheels with respect to vehicle speed by reason of differences in wheel diameters, rounding of curves, and momentary bad rail conditions.

Accordingly, it may be generally stated that the contact of each of the relays 31 is maintained in its picked-up or open position as long as the corresponding wheel unit or the wheels of the corresponding wheel unit do not rotate at more than a certain amount below a speed corresponding to vehicle speed.

If, however, due to the fact that the degree of braking exerted on the wheels of an individual wheel unit in response to a brake application, effected as previously described, causes the wheels to slip, a further operation of the apparatus occurs which will now be described. Let it be assumed that the left-hand wheel unit having a commutator switch device 34 associated therewith begins to slip. In such case, the rotational speed of the wheels of this unit correspondingly reduces below that equivalent to vehicle speed and the interval of time occurring between successive engagements of the brush 34c by the contact segment 34b is lengthened with respect to the discharge time of the condenser 32 as determined by the amount of the resistor 33a in the discharge circuit of the condenser at that instant. As previously explained, the amount of the resistor 33a included in the circuit at any given instant is substantially proportional to the vehicle speed. When, therefore, the interval of time elapsing between successive engagements of the brush 34d by the contact segment 34b is sufficiently lengthened with respect to the discharge time of the condenser 32 at a given instant, the winding of the relay 31 will be momentarily sufficiently deenergized in response to the die-away of condenser discharge current to permit the contact thereof to be restored to its dropped-out position. It will be understood, of course, that the relays 31 are fast-acting relays with substantially no lag in the operation thereof.

Upon the drop-out of the contact of the relay 31 corresponding to the wheel unit under consideration, a circuit is established for energizing one of two windings of relay 35 associated therewith, such one winding being hereafter designated pick-up winding a. This circuit may be traced from the positive terminal of the battery 54 by way of the closed pressure switch 23, positive battery wire 55, a branch wire 69 including a flexible portion which is attached to and permits movement of the switch contact arm 51, thence by way of the switch contact arm 51, contact 52, a wire 71, a branch wire 72, contact of relay 31 in its dropped-out or closed position, a wire 73 including the pick-up winding a of the relay 35, and negative battery wire 56 to the negative terminal of the battery 54.

The relays 35 are fast-acting relays and the single front contact of the energized relay 35 is accordingly instantly actuated to its picked-up or closed position to establish a self-holding circuit including the second winding of the relay 35, hereafter referred to as the holding winding b, which circuit constitutes also an energizing circuit for the magnet winding 25a of the magnet valve device 25 controlling the supply of fluid under pressure to the brake cylinders for the corresponding wheel units.

This circuit extends from the positive terminal of the battery 54 by way of the closed pressure switch 23, positive battery wire 55, a branch wire 74, the contact of the relay 35, a wire 75 including the holding winding b of the relay 35, the now-closed pressure switch 26, a wire 77, magnet winding 25a of the magnet valve device 25, a wire 76, and negative battery wire 56 to the negative terminal of the battery 54.

The contact of the relay 35 is thus "stuck" in its picked-up position notwithstanding the subsequent deenergization of the pick-up winding a in response to the immediately following engagement of the contact segment 34b with the brush 34d and the consequent energization of the winding of the relay 31 to interrupt the energizing circuit for the pick-up winding a of the relay 35.

It will be apparent, upon analysis, that the winding of the relay 31 associated with a slipping wheel unit will be alternately energized and deenergized in a manner to cause the alternate pick-up and drop-out of the contact thereof as long as the wheels of the wheel unit continue to rotate at a speed that is more than a certain amount below a speed corresponding to vehicle speed. Except under low speed conditions of the vehicle as hereinafter explained, the initial drop-out of the contact of relay 31 is thus effective to initiate a succeeding operation presently to be explained without regard to the alternate opening and closing of the contact of the relay 31.

Upon energization of the magnet winding 25a of the magnet valve 25, the supply communication through the branch pipe 18a to the two connected brake cylinders 14 and 15 is closed and a venting communication established through which fluid under pressure is rapidly released from the brake cylinders. The degree of application of the brakes on the corresponding wheel unit is thus correspondingly rapidly reduced.

The response of the relay 31 to a sufficient differential of the individual wheel speed below vehicle speed at a given instant causes so rapid and so prompt a reduction of the braking force exerted on the slipping wheel unit as to prevent the wheels from decelerating fully to a locked condition and sliding. Accordingly, therefore, due to the rapid and prompt reduction of braking force exerted on the slipping wheels, the wheels cease to decelerate and begin to accelerate back toward a speed corresponding to vehicle speed without actually locking and sliding. The interval of time elapsing between the instant that the wheels exceed a certain differential below vehicle speed recognized by the relay 31 to the instant that such wheels are restored fully to a speed corresponding to vehicle speed may be a matter of a few seconds. The interval of time required for pressure in the brake cylinders to reduce below fifteen pounds per square inch sufficient to open the pressure switch 26 is of substantially the same order of magnitude, that is, several seconds. It will be apparent, therefore, that substantially at the time the slipping wheels are restored fully to a speed corresponding to vehicle speed, the pressure switch 26 opens due to the continuing reduction of pressure in the brake cylinders associated therewith. The opening of the pressure switch 26 simultaneously interrupts the energizing circuit for the holding winding b of the relay 35 and for the winding of the magnet winding 25a of the magnet valve device 25. The magnet valve device 25 is thus instantly operated to sequentially cut off the venting communication from the brake cylinders and restore the supply communication through the branch pipe 18a.

Fluid under pressure is thus resupplied to the brake cylinders to effect reapplication of the brakes on the corresponding wheel unit. When the pressure in the brake cylinders thus increases above fifteen pounds per square inch, the opened pressure switch 26 is promptly reclosed. However, due to the drop-out of the contact of the relay 35 which has occurred in response to the opening of the pressure switch and the fact that the contact of the relay 31 is being maintained in its picked-up or open position at this instant due to the fact that the corresponding wheel unit is not now in a slipping condition, the reclosure of the pressure switch 26 is without effect except as it reconditions the energizing circuit for the magnet winding of the magnet valve device and for the holding winding b of the relay 35.

The operation of the relay 31 in response to the predetermined speed differential of an individual wheel unit below a speed corresponding to vehicle speed may take place over a wide range of speed from the maximum traveling speed down to a relatively low speed, such as ten miles per hour. At speeds below ten miles per hour the interval of time which elapses between successive engagements of the brushes 34c and 34d of the commutator switch devices by the associated contact segment 34b is increased sufficiently with respect to the discharge time of the condenser at the low speed of rotation of the wheel unit as to simulate a wheel slip condition when in fact a wheel slip condition does not exist. It follows, therefore, that unless suitable provision were made, the reduction in the speed of the vehicle below such low speed would effect a drop-out of the contact of the relay 31 in the same manner as if a wheel-slip condition had occurred.

In order, therefore, to prevent such an undesirable response of the relay 31, the switch device comprising the contact arm 51 and contact 52 is provided. It will be seen that when the speed of the vehicle reduces below ten miles per hour, the contact arm 51 disengages the contact 52, thereby opening the energizing circuit for the pick-up winding a of each of the relays 35. It follows, therefore, that notwithstanding the drop-out of the contact of any of the relays 31 in response to the reduction of vehicle speed below ten miles per hour, the relays 35 respectively controlled thereby cannot be actuated to picked-up positions. No operation of the magnet valve devices 25 to reduce brake cylinder pressure can thus occur.

The operation of the wheel-slip detecting apparatus associated with the two right-hand wheel units is substantially identical to that described for the one left-hand wheel unit having the commutator switch 34 associated therewith. It should be noted, however, that a single relay 35 is arranged so as to be severally controlled by the two relays 31 corresponding respectively to the two wheel units. Thus, drop-out of either of the two right-hand relays 31 will establish the energizing circuit for the pick-up winding a of the single relay 35 associated therewith. The operation of the corresponding magnet valve device 25 in response to the pick-up of the relay 35 is identical to that previously described for the other magnet valve device and it is accordingly deemed unnecessary to repeat such description.

When the vehicle comes to a complete stop as the result of a brake application in the manner previously described, the brakes on the vehicle will remain applied until such time as they are released by operation of the brake valve handle 17a to its brake release position prior to again starting the vehicle. Upon restoration of the brake valve handle 17a to its brake release position, the pressure in the control pipe and consequently in the brake cylinders 14 and 15 is reduced to atmospheric pressure by venting through the exhaust port and pipe 24 of the brake valve 17, thereby effecting complete release of the brakes. Pressure switches 26 and 28 are thus also both restored to their open position correspondingly. It will be apparent that with the pressure switch 28 opened, all supply circuits connectible to the battery 54 are interrupted and consequently no drainage of energy from the battery 54 occurs during propulsion of the vehicle.

Summary

Summarizing, it will accordingly be seen that we have disclosed deceleration control apparatus for a vehicle embodying a novel and improved apparatus of the speed differential type for detecting the slipping condition of vehicle wheels caused by braking and for so controlling the brakes in response to a slip condition as to prevent locking of the wheels and the consequent sliding thereof.

Our improved wheel-slip detecting apparatus is of particular advantage and practical utility in that it involves merely the application of a simple commutator device to each normally braked wheel unit of a vehicle, thereby eliminating and obviating friction, wear, derangement and other operational difficulties inherent in more complicated mechanisms associated directly with the wheel units and caused by shock and jar.

Basically, the novel principle of operation on which our improved apparatus is based is to effect a comparison of the speed of one rotating element or wheel unit with the speed of a rotation of another rotary element or wheel unit that rotates constantly at a speed corresponding to vehicle speed by periodically energizing a relay at a frequency proportional to the rotational speed of one wheel unit and varying the drop-out time of the relay in accordance with the variation of vehicle speed in such a manner that the relay is not sufficiently deenergized to drop-out unless the wheel unit reduces more than a certain amount below vehicle speed or unless the vehicle reduces below a certain low speed. In case of reduction of the vehicle below a certain low speed provision is made to prevent automatic release of the brakes.

It will be apparent that while we have shown an electrical transmission means for driving the governor GV in accordance with the speed of the vehicle, any other equivalent means, either electrical or mechanical in nature, may be employed for this purpose. It will be apparent also that other departures may be made from the exact embodiment of our invention as shown in the drawing without departing from the spirit of our invention as expressed in the appended claims.

It will be understood that in view of claims contained in our prior copending application Serial No. 521,640, referred to above, no claims to the general combination of elements for vehicle brake control purposes are contained in this application.

Having now described our invention, what we claim as new and desire to secure by Letters Patent is:

1. Apparatus for detecting a differential in the rotational speed of two separate rotary elements comprising, in combination, a relay, means responsive to the rotational speed of one of said rotary elements for periodically energizing the relay at a corresponding frequency, means responsive to the speed of rotation of the other of said elements for correspondingly varying the drop-out time of the relay, the aforesaid means cooperating in such a manner that said relay is maintained picked-up so long as the rotational speed of said one rotary element does not reduce more than a certain amount below the rotational speed of the said other rotary element, and means controlled by said relay.

2. Apparatus for detecting a differential in the rotational speed of two separate rotary elements comprising, in combination, a relay having an operating winding, means responsive to the rotational speed of one of said rotary elements for periodically energizing the winding of the relay at a corresponding frequency, variable resistance means associated with the winding of the relay operative to vary the drop-out time of the relay, means responsive to the speed of rotation of the other of said elements for operating said variable resistance means in correspondence therewith, the aforesaid means cooperating in a manner to maintain said relay picked-up so long as the rotational speed of the one rotary element does not reduce more than a certain amount below the rotational speed of the other rotary element and to cause alternate drop-out and pick-up repeatedly of the relay whenever and so long as the rotational speed of the one rotary element is more than said certain amount below that of the other rotary element, and means controlled by said relay.

3. Apparatus for detecting a differential in the rotational speed of two separate rotary elements comprising, in combination, a relay having an operating winding, a condenser, means responsive to the rotational speed of one of said rotary elements for periodically energizing the winding of the relay and charging said condenser in unison at a frequency corresponding to the rotational speed of said one rotary element, a discharge circuit for said condenser including the winding of said relay whereby the current discharged from the condenser between successive chargings of the condenser and energizations of the winding of the relay is effective to maintain the relay picked-up for an interval of time varying with the discharge time of the condenser, variable resistance means associated with said discharge circuit and operative to vary the discharge time of said condenser, means operatively responsive to the rotational speed of the other of said rotary elements for correspondingly operating said variable resistance means, the aforesaid means cooperating in a manner to maintain the said relay picked-up so long as the rotational speed of said one rotary element does not reduce more than a certain amount below the rotational speed of the other rotary element and to cause alternate drop-out and pick-up of the relay repeatedly whenever and so long as the rotational speed of the one rotary element is more than said certain amount below the rotational speed of the other rotary element, and means controlled by said relay.

4. Apparatus for detecting a differential in the rotational speed of two separate rotary elements comprising, in combination, a relay having an operating winding, a condenser, means responsive to the rotational speed of one of said rotary elements for periodically energizing the winding of the relay and charging said condenser in unison at a frequency corresponding to the rotational speed of said one rotary element, means for selectively varying the charging time of said condenser whereby to vary the degree of charge of said condenser during the charging interval, a discharge circuit for said condenser including the winding of said relay whereby current discharged from said condenser in said circuit serves to maintain the winding of the relay energized and the relay picked-up for an interval of time varying with the discharge time of the condenser, variable resistance means associated with the discharge circuit for varying the discharge time of said condenser, means operatively responsive to the speed of rotation of the said other rotary element to correspondingly operate said variable resistance means and thereby to correspondingly vary the length of time said relay is maintained picked-up in response to the current discharged from the condenser, the aforesaid means cooperating in such a manner as to maintain said relay picked-up so long as the rotational speed of said one rotary element does not reduce more than a certain amount below the rotational speed of the other rotary element and to cause alternate drop-out and pick-up of the relay repeatedly whenever and so long as the rotational speed of the one rotary element is more than said certain amount below the rotational speed of the other rotary element, and means controlled by said relay.

5. Apparatus for detecting a differential in the rotational speed of two separate rotary elements comprising, in combination, a relay, means operative according to the rotational speed of one of said rotary elements for periodically energizing said relay at a corresponding frequency, means operatively responsive to the speed of the other of said rotary elements for correspondingly varying the drop-out time of said relay, the aforesaid means cooperating to maintain said relay picked-up so long as the rotational speed of said one rotary element does not reduce more than a certain amount below the rotational speed of the other rotary element and to cause alternate drop-out and pick-up of the relay repeatedly whenever and so long as the rotational speed of the one rotary element is more than said certain amount below the rotational speed of the other rotary element, means controlled by said relay, and means responsive to the reduction in the rotational speed of the said other rotary element below a certain speed for rendering said relay ineffective to control the last said means.

6. Apparatus for detecting a differential in the rotational speeds of two separate rotary elements comprising, in combination, a relay having an operating winding, a condenser, means responsive to the rotational speed of one of said rotary elements for periodically energizing the winding of the relay and charging said condenser in unison at a frequency corresponding to the rotational speed of said one rotary element, a discharge circuit for said condenser including the winding of said relay whereby current discharged from said condenser through the winding of the relay between successive chargings of the condenser and energizations of the winding of the relay serves to maintain the winding energized and the relay picked-up for an interval of time varying according to the discharge time of the condenser, a rheostat associated with said discharge circuit, and means responsive to the speed of rotation of the other of said rotary elements for operating said rheostat correspondingly so as to vary the discharge time of said condenser in accordance with variations in the speed of rotation of the other of said rotary elements, the arrangement being such that said relay is maintained picked-up so long as the rotational speed of said one rotary element does not reduce more than a certain amount below the rotational speed of the other rotary element and alternately dropped-out and picked-up repeatedly whenever the rotational speed of the one rotary element is more than said certain amount below the rotational speed of the other rotary element, and means controlled by said relay.

CLAUDE M. HINES.
CARLTON D. STEWART.

REFERENCES CITED

The following references are of record in the file of this patent:

UNITED STATES PATENTS

| Number | Name | Date |
|---|---|---|
| 2,011,859 | Kalin | Aug. 20, 1935 |
| 2,262,173 | Fischer | Nov. 11, 1941 |
| 2,322,114 | Clare | June 15, 1943 |
| 2,325,401 | Hurlston | July 27, 1943 |
| 2,381,250 | Baumann | Aug. 7, 1945 |
| 2,390,084 | Edwards | Dec. 4, 1945 |